Feb. 1, 1966   N. LAING   3,232,522
FLUID FLOW MACHINE
Filed Sept. 5, 1962   10 Sheets-Sheet 1

INVENTOR
NIKOLAUS LAING
BY
ATTORNEYS

Feb. 1, 1966  N. LAING  3,232,522
FLUID FLOW MACHINE

Filed Sept. 5, 1962  10 Sheets-Sheet 4

INVENTOR
NIKOLAUS LAING
BY
ATTORNEYS

Feb. 1, 1966 N. LAING 3,232,522
FLUID FLOW MACHINE
Filed Sept. 5, 1962 10 Sheets-Sheet 5

INVENTOR
NIKOLAUS LAING
BY
ATTORNEYS

Feb. 1, 1966 N. LAING 3,232,522
FLUID FLOW MACHINE
Filed Sept. 5, 1962 10 Sheets-Sheet 6

INVENTOR
NIKOLAUS LAING
BY
ATTORNEYS

Feb. 1, 1966    N. LAING    3,232,522
FLUID FLOW MACHINE

INVENTOR
NIKOLAUS LAING
BY
ATTORNEYS

INVENTOR
NIKOLAUS LAING
BY
ATTORNEYS

United States Patent Office 3,232,522
Patented Feb. 1, 1966

3,232,522
FLUID FLOW MACHINE
Nikolaus Laing, Stuttgart, Germany, assignor, by mesne assignments, to Laing Vortex, Inc., New York, N.Y.
Filed Sept. 5, 1962, Ser. No. 221,621
Claims priority, application Germany, Dec. 7, 1956,
L 26,388, L 26,389, E 13,334
2 Claims. (Cl. 230—125)

This invention relates to improvements in fluid flow machines for inducing movement of fluids which is to be understood as including both liquids and gases, and this application is a continuation-in-part of application Serial No. 671,114, filed July 5, 1957, now abandoned. The invention concerns more particularly a cross-flow fluid machine of the type comprising a hollow cylindrical bladed rotor mounted for rotation about its axis and through which, in operation of the machine, fluid passes at least twice through the path of the rotating blades in a direction transverse to the axis of the rotor.

Various aspects of the invention are particularly adaptable for use with flow machines operating under conditions of low Reynolds numbers. The Reynolds number at a particular fluid flow condition is a dimensionless number representing the ratio of the product of flow velocity and a characteristic linear dimension of the part under observation to the kinematic viscosity of the fluid. For the purpose of the present application Reynolds number (Re) will be defined as $$Re = \frac{d \cdot c}{\gamma}$$

where $d$ is the blade depth radially of the rotor, $c$ is the peripheral speed of the rotor, and $\gamma$ is the kinematic viscosity of the fluid, the latter being equal to the quotient of the dynamic viscosity and density. A Reynolds number is considered herein to be low if, as above defined, it is less than $5 \times 10^4$.

From the definition just given, it will be understood that flow machines operating under low Reynolds number conditions are small dimensionally, run at low peripheral speeds, or are intended for use with air or other gas having a low density or used with a fluid having a high viscosity.

It is known that in a fluid machine of the above-mentioned type, an initial acceleration and a subsequent deceleration of the flow occurs in boundary layers on the suction side of each blade as fluid passes over the blade. The higher the viscosity of the fluid in relation to its density or in relation to the relative velocity between the blade and fluid (i.e. the lower the Reynolds number) the greater is the deceleration of the boundary layer in the deceleration zone of the blade. If the boundary layer is slowed down sufficiently, it separates from the blade and no longer follows the blade contour. The point at which separation occurs is known as the separation point. The separation point travels forward along the surface of the blade against the direction of flow in proportion to the increase in the effect of the viscosity relative to density or to the decrease in the relative velocity between the fluid and the blade.

The movement forward of the separation point along the blade because of low Reynolds number conditions produces a number of undesirable effects in the type of flow machine described. A vorticity zone in which the kinetic energy of the fluid is converted into thermal energy is produced at the separation point with the result that the efficiency of the machine drops. The degree of deflection of the fluid in passing through the rotor and through the path of the rotating blades decreases owing to the fact that the flow does not follow the full extent of the blade profile but becomes non-laminar beginning at the separation point. This results in less pressure gain in the machine since pressure gain is determined by the extent of the deflection of the stream tubes in the blade channel. Finally, the turbulent flow in back of the separation point effectively reduces a part of the cross-section of the blade channels so that the throughput through the rotor of the machine also diminishes.

It has previously been considered that the operation of conventional rotary type flow machines under conditions of low Reynolds numbers would necessarily and inescapably involve low efficiencies in comparison with efficiencies obtainable under conditions of high Reynolds numbers. For example, although the inefficiency of the small blowers above referred to has been notorious, it has been tolerated simply because it has not hitherto been thought capable of improvement.

It has hitherto been thought that to avoid mixing losses a rotary type flow machine operating under both high and low Reynolds numbers conditions should always be designed to have a rectangular velocity profile at every section taken across the flow, that is, the graph of velocity of fluid flow at a given point plotted across the flow channel should rise rapidly from zero at one side of the channel to a steady value maintained over the greater part of the section and should then drop again rapidly to zero at the other side. It has also been assumed hitherto that a cross-flow machine of the type described should always have the blades loaded approximately equally by the fluid in the circumferential zones where the fluid passes through the rotor blades. These two related conditions can normally be satisfied without much difficulty.

Various aspects of the invention depend in part on the appreciation that contrary to what has previously been thought by those skilled in the art, it can be advantageous to bring about in a cross-flow machine a velocity profile having a pronounced maximum with a consequent very unequal loading of the blades in the circumferential zones through which fluid passes. This velocity profile with a pronounced maximum gives rise to some flow tubes within the blower having much greater velocity than the other flow tubes within the blower.

In the restricted circumferential zones of the rotor blades through which the high velocity flow tubes pass, correspondingly high relative velocities exist locally between the fluid and the blades, so that in these zones momentum is imparted to the fluid at efficiencies which could otherwise be obtained only with machines operating under conditions of correspondingly much higher Reynolds numbers. The velocity profile with a pronounced maximum leads to lower velocities than the mean velocity in other circumferential zones of the rotor blades and in these zones transfer of momentum occurs at an efficiency which is lower than it would have been had the velocity profile been rectangular. However, the available momentum in a flow tube issuing from the blades increases with the third power of its velocity, thus the momentum of the fluid as a whole is therefore substantially concentrated in the high velocity flow tubes so that the transfer efficiencies in the zones of slow throughflow have little effect on the over-all efficiency.

Parts of the invention depend in part also on the appreciation that the above-mentioned velocity profile with a pronounced minimum can be obtained by setting up in the machine a substantially cylindrical fluid vortex including a field region with a velocity profile approximating that of a Rankine vortex having a core interpenetrating the path of the blade envelope formed when the rotor rotates and that the throughput of the machine may be varied by controlling the intensity of the vortex. Various embodiments of the invention provide means for controlling entry of the fluid into the vortex zone, from either the inlet of the machine or from fluid that may be recirculated back from the outlet, thus controlling the intensity of the vortex.

Broadly the invention including the means for varying vortex intensity comprises a cylindrical bladed rotor mounted for rotation about its axis, a vortex forming and stabilizing means mounted exteriorly of the rotor whereby when the machine is operated, a fluid vortex is formed having a core interpenetrating the blade envelope, and valve means for controlling flow of fluid entering the rotor adjacent the rotor inlet and vortex forming means whereby the fluid entering the vortex zone may be varied which in turn varies the vortex intensity and throughput of the machine.

It is desirable in some applications of cross-flow machines that the output may be converted to an increase in pressure. It therefore is an object of the invention to provide diffusor constructions that may be utilized with a cross-flow type machine to convert the velocity of fluid delivered to an increase in pressure and, further, to provide means where the increase in pressure is substantially constant notwithstanding throughput of the machine.

Broadly such diffusor constructions involve including diverging guide means in the delivery side of the machine and means for recirculating a part of the fluid from the diffuser section back to the inlet of the machine when throughput of the rotor is high and not recirculating the fluid back to the inlet when the throughput of the rotor is low. Further diffuser constructions according to the invention include means for recirculating a portion of the boundary layer in the diffuser to the inlet of the machine to maintain laminar flow along the side walls of the diffusor section and thus increase the diffuser effect caused by the diverging side walls.

In many applications of fluid machines, it is desirable that the pressure of the fluid at the delivery side of the machine be constant over the cross-sectional area of the delivery or exit duct. It is therefore an object of the invention to provide means whereby the delivery pressure of a cross-flow machine delivering fluid at different velocities over the delivery area may convert the energy of the velocity into equal pressure again.

Broadly the invention contemplates the use of a plurality of diverging guide plates in the diffuser section of a cross-flow machine wherein the plates form diverging channels of varying degree within the diffuser section whereby flow tubes having varying velocity may be slowed and their energy converted to pressure again, the amount of divergence of the channels being dependent upon the velocity of the flow tube passing therethrough.

It is desirable in cross-flow machines having bladed rotors that shock caused by fluid passing over the individual blades be kept to a minimum. It is therefore an object of the invention to provide means for increasing the turbulence of the boundary layer of fluid passing over the blades in order to reduce shock at entry of the lower velocity flow tubes to the blades.

The means for reducing shock comprises generally adding a flow disturbing means to the inner edge of the blades of the rotor which will increase the turbulence of flow passing over the blade when the fluid passes out of the rotor to the exit side of the machine. In a further form, the blades may have a thickened cross-section adjacent their inner edges to produce the turbulence desired.

The invention also contemplates producing multistage machines utilizing cross-flow machines in order to achieve high delivery pressures. In this event, the rotors of a plurality of machines are mounted parallel with the outlet of one rotor leading to the inlet of an adjacent rotor.

Improved rotor constructions for cross-flow machines are considered a part of the invention wherein the rotors are constructed to give the fluid leaving the rotor an axial component of direction. In this event, the rotors are made with the individual blades being spiraled about a portion of a rotor.

A cross-flow machine of the type desired has particular application to different forms of electric heaters and the invention is considered to include various constructions wherein heating elements are contained in the path of the fluid flow through the machine. Further forms of the heaters have thermostat control means for varying the throughput by changing the position or intensity of the vortex formed.

The invention also contemplates a cross-flow machine constructed without the necessity of including separate guide means to form inlet and outlet areas of the rotor. In this instance, the machine consists only of the bladed cylindrical rotor mounted for rotation about its axis, means for rotating the rotor, means for closing the ends of the rotor, and vortex forming and stabilizing means exterior of the rotor to form and stabilize a cylindrical fluid vortex interpenetrating the blade envelope wherein the forming and stabilizing means separates the suction and pressure sides of the rotor. The flow of fluid adjacent the vortex core passing through the rotor is sufficient to guide the flow through the rotor, and since the majority of the flow occurs in the region adjacent the vortex, it is not necessary to have means enclosing the radially opposite side of the rotor to separate inlet and outlet portions of the rotor.

Referring to the accompanying diagrammatic drawings in which preferred embodiments of the invention are shown.

Figures 1, 2, 3, 4:
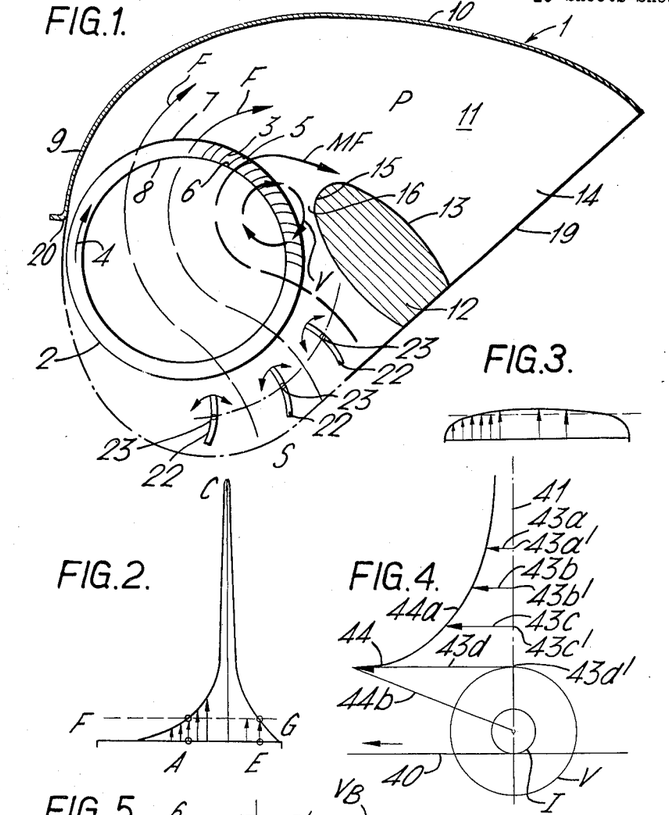
FIG. 1 is cross-sectional view of a fluid machine constructed in accordance with the invention having throttling means at the inlet in order to control throughput of the machine.
FIG. 2 is a graph illustrating velocity of fluid flow at the outlet of a cross-flow fluid machine utilizing a fluid vortex for guiding in part the flow through the rotor of the machine.
FIG. 3 is a graph illustrating the velocity of fluid flow at the outlet of a conventional cross-flow machine.
FIG. 4 is a graph illustrating velocity of fluid flow within the field and core of the Rankine type fluid vortex.

Referring to the drawings in which like parts have like numbers and in particular to FIG. 1. 1 denotes a fluid flow machine constructed according to the invention having a cylindrically bladed rotor 2 having thereon a plurality of blades 3 concavely curved in the direction of rotation of the rotor indicated by the arrow 4 wherein the blades 3 have their outer edges 5 leading their inner edges 6. The outer edges define an outer envelope 7 while the inner edges define an inner envelope 8 when the rotor is rotated. The rotor is mounted, by means not shown, whereby it will rotate about its axis. A guide wall 9 extends the length of the rotor and merges with a wall 10 to form one side of an exit duct 11 of the machine. A vortex-forming and stabilizing means 12 also extends the length of the rotor and is positioned exteriorly thereof and has thereon a wall 13 which forms part of the exit duct and which more particularly forms part of a diffuser section 14 as is more fully explained hereafter.

The vortex-forming and stabilizing means 12 has a rounded end 15 which has a portion extending towards the rotor in the direction of rotation to form a converging gap 16 which, as more fully explained hereafter, serves to form and stabilize a fluid vortex when the rotor is rotated. The means 12 also serves to separate the suction side S from the pressure side P of the machine and defines with the wall 9 an entry and an exit region to the rotor. End walls 19, only one of which is shown, substantially cover the ends of the machine.

The wall 9 terminates at point 20 which is spaced from the rotor a minimum of one-third the blade depth and not more than three times the blade depth of the blades 3 in order to minimize interference which causes an undesirable noise when the machine is operated while at the same time the wall provides a means to guide the flow leaving the machine. Wall 15 of the vortex-forming and stabilizing means 12 likewise is spaced a substantial distance from the rotor, in this instance a distance equal to a minimum distance of at least one-third the blade depth of the blades of the rotor. Because both the wall 9 and the vortex-forming and stabilizing means 12 are spaced from the latter a substantial distance, close manufacturing tolerances do not have to be observed when assembling the machine and, as such, the machine lends itself to economical construction such as is achieved when sheet metal stampings are utilized.

A series of curved control vanes 22 are arranged at the suction side S of the rotor and are supported on axes 23 running parallel to the rotor axis and disposed on an arc centered thereon. The vanes 22 can be adjusted, either separately or together, to control the angle at which flow tubes F pass through the rotor from the suction side with the vanes 22 being set to produce the optimum angle. If the two left-hand vanes are turned clockwise substantially 90°, only the high velocity flow tube MF may enter the rotor, as more fully explained hereafter.

In operation of the fluid machine illustrated in FIG. 1, a fluid vortex having a core designated by the line V approximating a Rankine type vortex is formed wherein the core is positioned eccentrically with respect to the rotor axis and wherein the core will interpenetrate the path of the rotating blades of the rotor. The whole throughput of the machine will then flow twice through the blade envelope in a direction perpendicular to the rotor axis indicated by the flow lines F.

FIG. 4 illustrates an ideal relation of the vortex to the rotor 2 and the distribution of flow velocity in the vortex and in the field of the vortex. The line 40 represents a part of the inner envelope 6 of the rotor blades 3 projected onto a straight line while the line 41 represents a radius of the rotor taken through the axis of the vortex core V. Velocity of fluid at points on the line 41 by reason of the vortex is indicated by the horizontal lines $43a$, $43b$, $43c$ and $43d$, the length of these lines being the measure of the velocity at the points $43a^1$, $43b^1$, $43c^1$ and $43d^1$. The envelope of these lines is shown by the curve 44 which has two portions, portion $44a$ being approximately a rectangular hyperbola and the other portion, $44b$, being a straight line. Line $44a$ relates to the field region of the vortex and the curve $44b$ to the core. It will be understood that the curve shown in FIG. 4 represents the velocity of fluid where an ideal or "mathematical" vortex is formed, and that in actual practice, flow conditions will only approximate these curves.

The core of the vortex is a whirling mass of fluid with no translational movement as a whole and the velocity diminishes from the periphery of the core to the axis 42. The core of the vortex intersects the blade envelope as indicated at 40 and an isotach I within the vortex having the same velocity as the inner envelope contacts the envelope. The vortex core V is a region of low pressure and the location of the core in a machine constructed according to the invention can be determined by measurement of the pressure distribution within the rotor.

The velocity profile of the fluid where it leaves the rotor and passes through the path of the rotating blades will be that of the vortex. In the ideal case of FIG. 4, this profile will be that of the Rankine vortex there shown by curves 43a and 43b, and in actual practice, the profile will still be substantially that shown in FIG. 4 so that there will be in the region of the periphery of the core V shown in FIG. 1 a flow tube MF of high velocity and the velocity profile taken at the exit of the rotor will be similar to that shown in FIG. 2 where the line FG represents the exit of the rotor and the ordinates represent velocity. The curve shown exhibits a pronounced maximum point C which is much higher than the average velocity represented by the dotted line.

It will be appreciated that much the greater amount of fluid flows in the flow tubes in the region of maximum velocity. It has been found that approximately 80% of the flow is concentrated in the portion of the output represented by the line AE which is less than 30% of the total exit of the rotor. A conventional velocity profile for fluid flow in a defined passage is illustrated by way of contrast in FIG. 3 where the average velocity of flow is represented by the dotted line. Those skilled in the art regard this profile as being approximately a rectangular profile which following the principle generally adhered to is the sort of profile heretofore sought in the outlet of a flow machine.

The maximum velocity C shown in FIG. 2 appertains to the maximum velocity flow tube indicated as MF in FIG. 1. With a given construction the physical location of the flow tube MF may be closely defined. The relative velocity between the blades and fluid in the restricted zone of the rotor blades 3 through which the flow tube MF passes is much higher than it would be if a flow machine were designed following the conditions adhered to heretofore in the art respecting the desirability of a rectangular velocity profile at the exit arc and even loading of the blades.

Under low Reynolds number conditions, this unevenness of the velocity profile leads to beneficial results in that there will be less separation and energy loss in the restricted zone through which the flow tube MF passes than if that flow tube had the average velocity of throughput taken over the whole exit of the rotor. There is a more efficient transfer of momentum to the fluid by the blades in this restricted zone and while the transfer of momentum in the flow tubes traveling below the average velocity will be less efficient, nevertheless when all of the flow tubes are considered, there is a substantial gain in efficiency.

Figure 5:
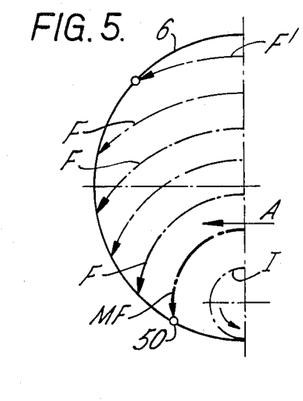
FIG. 5 illustrates the ideal fluid flow occurring in one half the cross-sectional area of a rotor of a fluid machine constructed according to the invention.

FIG. 5 illustrates the ideal distribution of flow tubes F occurring within one half the rotor area defined by the inner envelope 6, it being understood that the flow tubes in the other half of the rotor are similar. The maximum velocity flow tube MF is shown intersecting the envelope 6 at point 50 and the isotach I as being circular when the whole rotor is considered. It is seen that ideally the maximum velocity flow tube MF undergoes a change of direction of substantially 180° from the suction to the pressure sides when the flow in the whole rotor is considered. It is also to be noted that the major part of throughput, represented by the flow tube MF, passes through the rotor blades where they have a component of velocity in a direction opposite to the main direction of flow within the rotor indicated by the arrow A.

Figure 6:
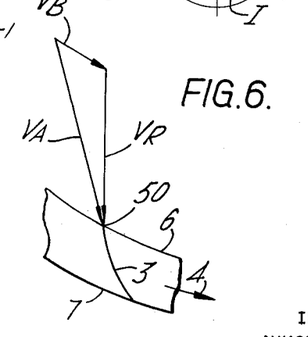
FIG. 6 is a vector diagram illustrating flow of fluid contacting a blade of rotor of a machine constructed according to the invention where the fluid is passing from the interior of the rotor to the exit side of the machine.

FIG. 6 is a diagram showing the relative velocities of flow with respect to a blade at the point 50 referred to in FIG. 5. In this figure $V_B$ represents the velocity of the inner edge of the blade 3 at the point 50, $V_A$ the absolute velocity of the air in the flow tube MF at the point 50, and $V_R$ the velocity of that air relative to the blade as determined by completing the triangle. The direction of the vector $V_R$ coincides with that of the blade at its inner edge so that fluid flows by the blade substantially without shock.

The character of a vortex is considered as being determined largely by the blade angles and curvatures. The position of the vortex, on the other hand, is considered as being largely determined by the configuration of the vortex forming means which forms and stabilizes a vortex in cooperation with the bladed rotor. The particular angles and curvatures in any given case depend upon the following parameters: the diameter of the rotor, the depth of a blade in a radial direction, the density and viscosity of the fluid, the disposition of the vortex forming means and the rotational speed of the rotor, as well as the ratio between over-all pressure and back pressure. These parameters must be adapted to correspond to the operating conditions in a given situation. Whether or not the angle and shape of the blades have been fixed at optimum values is to be judged by the criterion that the flow tubes close to the vortex core are to be deflected substantially greater than 90°.

It is to be appreciated that the flow lines of FIG. 1 do not correspond exactly to the position of the vortex core V as illustrated in FIGS. 4 and 5 which represent the theoretical or mathematical flow. These latter figures show that is is desirable to have the axis of the core of the vortex within the inner blade envelope 6 so that the isotach within the core osculates that envelope. Although this position is achieved in certain constructions hereinafter described, it is not essential, and in fact, is not achieved in the structure shown in FIG. 1.

It is to be further appreciated that despite the divergence of the flow in FIG. 1 from the ideal, the maximum velocity flow tube MF with which is associated the major part of the throughput is nevertheless turned through an angle of substantially 180° in passing from the suction to the pressure side of the rotor and that this maximum flow tube passes through the rotor blades where the blades have a velocity with a component opposite to the main direction of flow through the rotor as indicated by the arrow A.

Referring back to FIG. 1, it is seen that a series of curved control vanes 22 are arranged at the entry side of the rotor and are pivotally mounted for rotation either separately or together to control the angle at which particular flow tubes reach the rotor. If the two left-hand vanes are turned clockwise substantially 90°, only the high velocity flow tube MF and those immediately adjacent it may enter the rotor. However, as discussed above, the major flowthrough occurs along this flow tube which passes close to the vortex core and little flow takes place in the left-hand region of the rotor. Accordingly, there is little to be gained controlwise by providing control vanes extending over the complete entry region of the rotor. It is thus seen that the throughput of a fluid machine constructed according to the invention may be effectively controlled by controlling only the admission of fluid entering the rotor adjacent the vortex forming and stabilizing means.

Figures 7, 8, 9, 10:
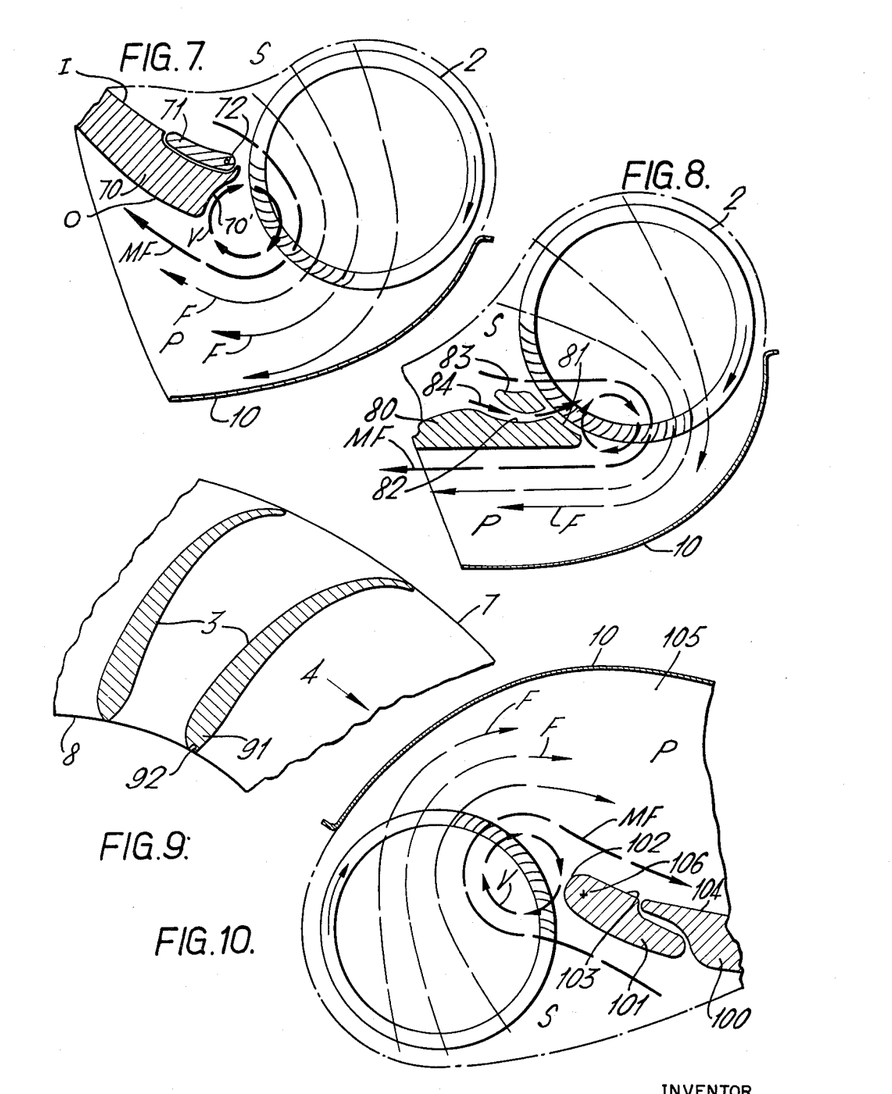
FIG. 7 is a cross-sectional view of a cross-flow machine having control means at the inlet for controlling throughput.
FIG. 8 is a cross-sectional view of a cross-flow machine having means at the inlet for increasing the intensity of a vortex.
FIG. 9 is an enlarged cross-sectional view of a modified blade of a rotor having a minimum tendency for producing shock.
FIG. 10 is a cross-sectional view of a cross-flow machine having means for controlling throughput by recirculating fluid from the outlet to the inlet of the machine.

FIG. 7 illustrates a further form of cross fluid machine wherein the throughput may be effectively controlled by controlling only the fluid entering the rotor adjacent the vortex forming means. In the machine there shown the vortex-forming and stabilizing means 70 has an inlet guide surface I which forms part of the side wall of an inlet duct for the machine and an outlet guide surface O which forms part of the side wall of an outlet duct for the machine where the two guide surfaces are spaced circumferentially with respect to each other. In addition the vortex forming and stabilizing means 70 has a guide portion 70' extending between the inlet and outlet guide surfaces to direct a portion of the flow from the exit duct back towards the inlet duct whereby a vortex is formed and stabilized in the same manner as is the machine in FIG. 1. The means 70 has a flap 71 pivotally mounted for rotation about axis 72 whereby the flap may be moved outwardly to shut off flow of the high velocity flow tube MF entering the rotor. When the flap is in the extended position, the major part of flow through the machine will be shut off with only a minor part entering the rotor through that portion which is radially opposite the high velocity flow tubes.

The machine illustrated in FIG. 8 shows a means for increasing the intensity of the vortex formed, and thus increasing the throughput of the machine by admitting air from the inlet or suction side of the machine so that it will coincide with the periphery of the vortex core to increase its intensity. The vortex-forming and stabilizing means 80 shown has a wall 81 conforming to the rotor curvature over an arc of substantially 10°, and a second wall 82 on the entry side which is concave thereto and which intersects the wall 81 at an obtuse included angle. An auxiliary body member 83 is spaced from the wall 82 to define therewith a channel 84 to guide fluid from the inlet S into the rotor at a desired angle. The arrangement of the structure is such that fluid entering the rotor through the channel 84 is directed to coincide with the periphery of the vortex core V and so forms part of the high velocity tube MF and this increases the throughput of the machine.

It is known in the fluid dynamics art that shock at the leading edge of an airfoil may be reduced if turbulence of the boundary layer flowing over the airfoil is increased. The construction illustrated in FIG. 9 represents a cross-section of the blade of the rotor 2 wherein the blade has thickened inner surfaces 91, which besides increasing turbulence over the blade, reduces the shock at entry to the blades of the lower velocity flow tubes on the second transversal by the throughput passing through the rotor. A still further increase of turbulence can be obtained by including grooves or flutings 92 or other flow disturbing irregularities at the inner edges of the blades if reduction of shock on the second transversal of fluid over the blades is desired and also to the outer edges if reduction of shock on the first transversal is desired. The fluting shown in FIG. 9 is only included on the inner edges of the blade.

Shock may also be reduced by making the ends of the blades rounded as shown so as to reduce their sensitiveness to change in angle of attack in turn caused by the change in angle of flow passing over a blade as the blade passes through the entry and exit regions of the rotor.

Figure 11:
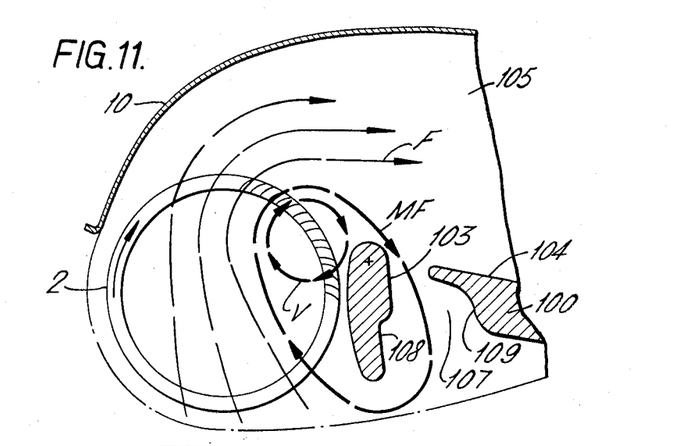
FIG. 11 is a view similar to FIG. 10 showing fluid being circulated from the outlet to the inlet of the machine.

The invention also contemplates an embodiment of a fluid flow machine wherein a portion of the main flow passing from the rotor is recirculated back to the inlet in order to maintain a constant pressure difference across the machine notwithstanding throughput. In the structure shown in FIG. 10, the machine comprises a fixed body member 100 cooperating with a movable body member 101 to form, as shown in FIG. 10, a composite vortex-forming and stabilizing means fulfilling the same function as the body member 12 in FIG. 1. The gently rounded end 102 of the body 101 defines a converging gap with the rotor 1 which, as explained previously, serves to form and stabilize a vortex having the core V when the machine is operated. The body 101 has a wall 103 which, with wall 104 of the body 100 acts as a side wall to the exit duct 105 of the machine to guide the flow tube MF out of the duct 105. When the movable body 101 is pivoted about axis 106 to the position as shown in FIG. 11, the rounded end adjacent the rotor 1 presents approximately the same profile to the fluid leaving the rotor so that the vortex continues to be formed and remains substantially in the same position as shown in FIG. 10. The high velocity tube MF, however, is no longer guided to the outlet of the machine by the walls 103 and 104, but instead is guided back to the entry side of the rotor through passage 107 formed by wall 108 of body 101 and wall 109 of body 100 to again reenter the rotor on the suction side of the machine, and in so doing, it forms a closed circuit as indicated in FIG. 11. As a result of this construction, the throughput of the rotor exceeds that of the machine as a whole with the throughput of the machine being only that flow which is not recirculated back to the suction side and which, as indicated previously, comprises only a minor proportion of the total throughput of the rotor.

Figures 12, 17:
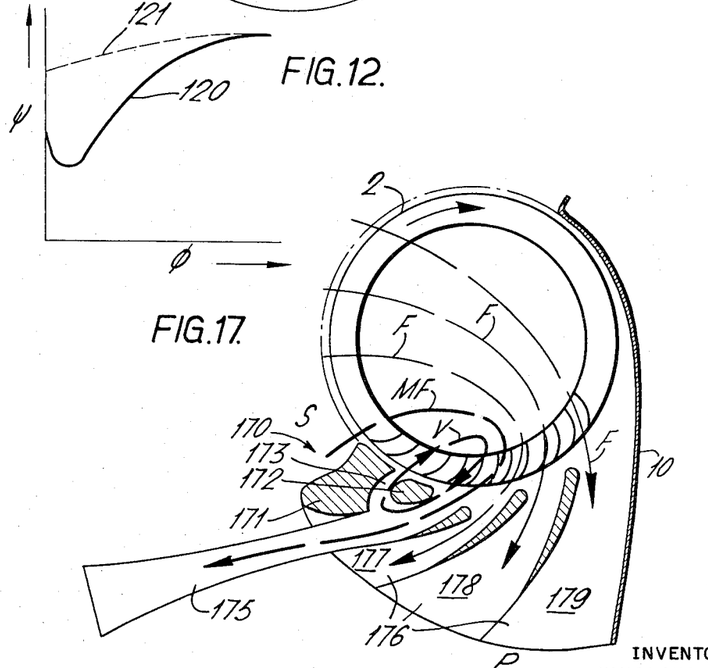
FIG. 12 is a graph illustrating the average pressure difference between the inlet and outlet as compared with the throughput of a machine constructed according to the invention.
FIG. 17 is a cross-sectional view of a cross-flow machine wherein a portion of the fluid at the outlet can be made to have a higher order of pressure magnitude than other portions at the outlet.

FIG. 12 represents a comparison of the fluid pressure difference across a machine constructed according to the invention with the throughput volume where $\psi$ represents the average pressure difference between the suction and pressure sides of the machine and $\phi$ represents the throughput volume. The curve 120 represents the comparison of fluid pressure difference with throughput volume when the machine of FIG. 10 has the means 101 in the position shown. The curve 121 represents the pressure difference across the machine when the movable part 101 takes the position as shown in FIG. 11 where it is seen that change in throughput has little effect on pressure since a major part of the throughput is being recirculated back to the inlet. This characteristic is important where several machines such as that shown in FIGS. 10 and 11 are operated in parallel where it is desired that the pressure in the circuits be substantially the same.

Figure 13:
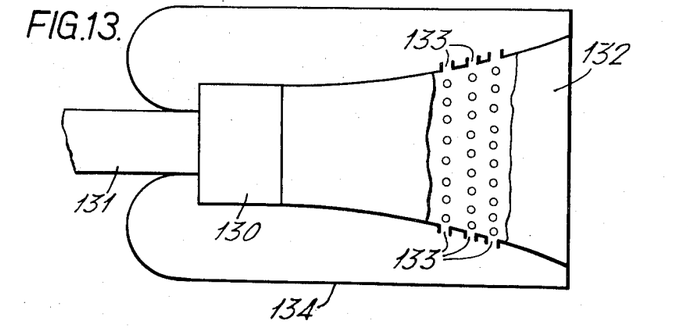
FIG. 13 is a diagrammatic view of a diffuser combined with means for recirculating boundary layer from the diffuser sidewalls to the inlet of a machine constructed according to the invention.

Unless the outlet of the machine according to the invention is constructed as a diffuser, pressure at the outlet will be low. Diffuser construction thus is important when the machine is to be used to increase pressure of a fluid and special problems arise when used in a machine constructed according to the invention because of the particular velocity profile at the outlet of the machine. Referring to FIG. 13, a diffuser is illustrated whereby the efficiency of conversion of velocity to pressure energy may be substantially improved. The structure comprises a flow machine 130 having an inlet 131 and a diffuser section 132 connected to the outlet of the flow machine. The walls of the diffuser section are perforated as shown at 133 in the region where the tendency of the boundary layer to separate from the walls of the diffuser is the greatest. Conduit means 134 connect the perforations with the inlet of the flow machine so that the flow comprising the boundary layer is removed through the perforations by suction and is recycled back to the inlet of the machine. In this way, laminar flow will be preserved over a greater area of the diffuser so increasing pressure.

Figure 14:
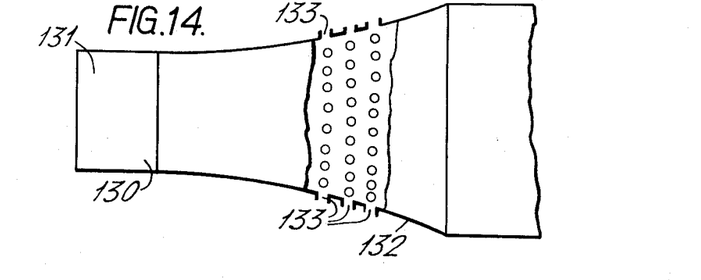
FIG. 14 is a diagrammatic view of an improved diffuser applied to a cross-flow machine constructed according to the invention.

The structure illustrated in FIG. 14 is generally similar to that illustrated in FIG. 13 except that no positive means are included for recirculating the fluid comprising the boundary layer. The back pressure against which the machine works is the determining factor controlling the passage of the fluid comprising the boundary layer through the perforations 133 with a high back pressure resulting in a greater flow through the perforations. Referring to FIG. 12, it is to be noted that if a machine according to that shown in FIG. 1 has a diffuser such as that shown in FIG. 13 or FIG. 14, the machine will operate over a curve 122. The difference in pressure at low throughput values over a machine as shown in FIG. 1 when combined with a diffuser such as shown in FIGS. 13 and 14 is considerably increased over that which it would have been without the use of the diffuser.

Figure 15:
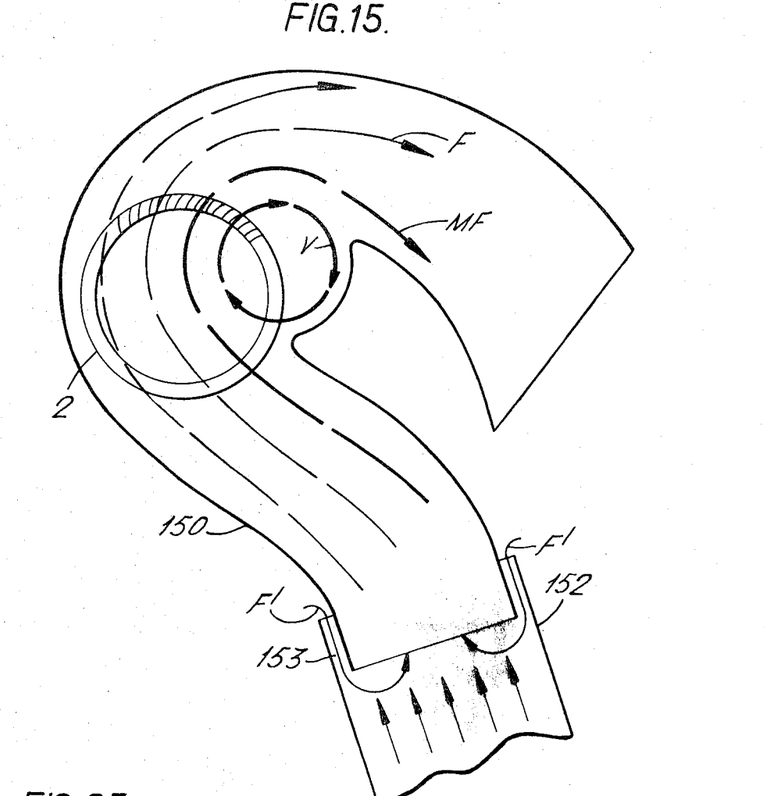
FIG. 15 is a partial cross-sectional view of a modified inlet as applied to a cross-flow machine wherein the pressure difference from the inlet to the outlet remains substantially constant notwithstanding change in throughput.

A similar effect can be achieved by a duct arrangement such as that shown in FIG. 15 where a duct 150 leads to a flow machine of the type previously discussed and wherein a duct 152 leads fluid to the duct 150. Duct 150 extends within the downstream of duct 152 with a clearance so as to form an annular passage 153. When the pressure in duct 152 is considerably below that of the surrounding fluid or atmosphere, the fluid will then pass through the passage 153 along the flow line F' into the duct 150 and thence to the flow machine such that the throughput of the machine is raised. Since the throughput is raised, the pressure difference across the machine is also raised. The length and cross-section of the passage 153 should be designed to balance pressure due to the moving fluid stream represented by the lines F at the periphery of the duct 150 against the static pressure difference between the interior of the duct 152 and the exterior.

Figure 16:
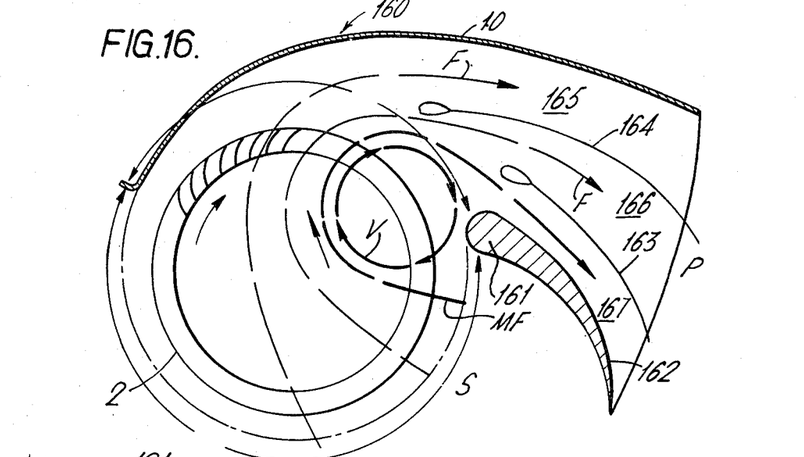
FIG. 16 is a cross-sectional view of a cross-flow machine having guide means in the diffuser section for obtaining equal pressure across the outlet.

Referring to FIG. 16, there is illustrated a crossflow machine 160 of the general type as shown in FIG. 1 with the major exception that the throttling means at the inlet of the machine shown in FIG. 1 is eliminated. A further difference is that the diffuser section includes a slightly modified vortex forming and stabilizing means 161 having a sharply diverging wall 162 and intermediate wall members 163 and 164 formed of sheet material which divide the diffuser section into three separate diffuser channels, 165, 166 and 167. These channels are so curved that the degree of conversion in a channel from velocity energy of the fluid passing therethrough to pressure energy is inversely proportional to the average velocity at entry to the channel.

In some instances it may be desired to only use the pressure generated by the high velocity flow tube MF while dispensing with the pressure generated by the remainder of the flow tubes. In FIG. 17, a fluid flow machine is illustrated which has therein vortex-forming and stabilizing means 170 comprising in turn a body member 171 and auxiliary body member 172 which is spaced from the body member 171 and forms therewith a channel 173 such that a vortex having a core V may extend therethrough when the machine is operated. The outlet of the machine is formed as two separate diffusers designated generally 175 and 176 the first of which receives only the high velocity flow tube MF, while the other diffuser 176 is divided into three channels, 177, 178 and 179 constructed similarly to the channels 165, 166 and 167 of FIG. 16. The pressure, that is, excess pressure over pressure at entry to the rotor, at the outlet of the diffuser 175 can be made an order of magnitude higher than the pressure at the outlet of diffuser 176. In many applications of cross-flow blowers, for example, blowers used for forges or organs, better results can be obtained by dispensing entirely with that part of the throughput which in the FIG. 17 construction is collected in diffuser 176.

Figure 18:
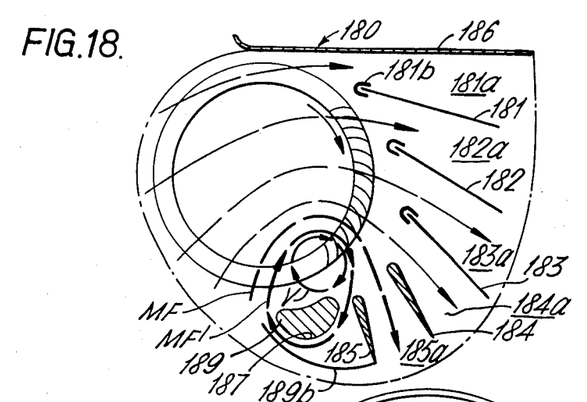
FIG. 18 is a cross-sectional view of a cross-flow fluid machine having an improved short diffusor construction.

It is known that diffusers are more efficient if they are relatively short. FIG. 18 illustrates a machine 180 having a plurality of guide bodies 181, 182, 183, 184 and 185 which with wall 186 and wall 187 of the vortex forming and stabilizing means 189 form diverging channels 181a, 182a, 183a, 184a and 185a. The guide bodies may be streamlined as guide bodies 184 and 185, or for simplicity, the streamline shape may be replaced by thin constant thickness partitions, as body 181, having a thickened end or bead portion 181b which serves to reduce shock losses by producing a turbulent boundary layer. If desired, the guide walls 181, 182 and 183 may be made pivotable to serve as a regulating means.

The vortex forming and stabilizing means 189 differs from that shown in FIG. 1 in that it has a round profile portion extending close to the body 185 and a curved guide wall portion 189b running between the body 185 and a point near the rotor and spaced from the member 189 on the suction side thereof. Although the high velocity flow tube MF passes into the diffuser channel 184, a subsidiary flow MF' is guided back into the rotor and around the vortex core V by the guide wall 189b and member 189 which helps to stabilize the position of the vortex in the machine.

Cross-flow machines of the type described may be used in combination to form multi-stage fluid machines wherein each of the stages delivers air to a succeeding stage at an increased pressure. Cross-flow machines constructed according to the invention are characterized in that there is little pressure rise across the machine between the entry side and exit of the rotor. Thus, in order to provide sufficient pressure increase in the multi-stage machine, it is desirable that some form of diffuser be utilized between the stages.

Figures 19, 20:
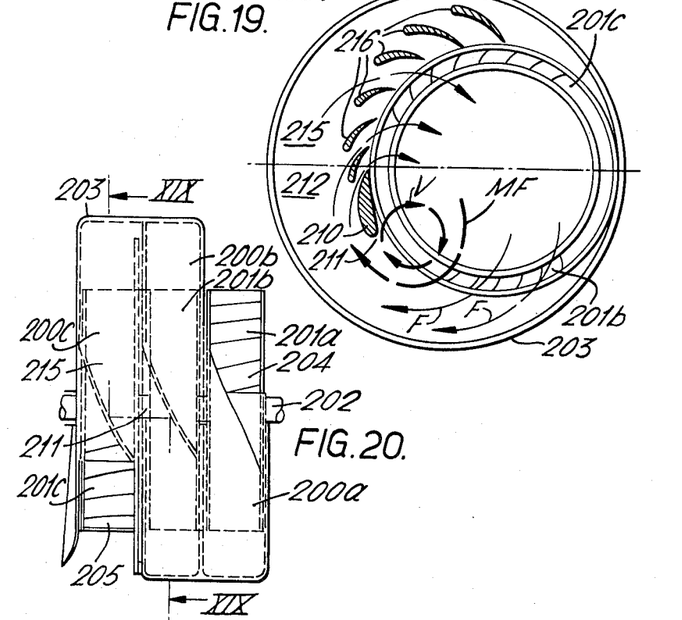
FIG. 19 is a cross-sectional view of a multi-stage fluid machine having a plurality of cross-flow machines.
FIG. 20 is a partial sectional side view of the machine illustrated in FIG. 19.

The multi-stage machines illustrated in FIGS. 19 and 20 comprise three stages designated generally 200a, 200b and 200c, each having cylindrically bladed rotors 201a, 201b and 201c closed at their ends and mounted coaxially about a shaft 202 as a single rigid assembly contained within a casing illustrated generally as 203. The first stage has an entry 204 while the third stage has an exit 205.

Referring to FIG. 19, it is seen that fluid flows from the rotor 201b to the rotor 201c and that a guide body 210 is located at the exit from the rotor 201b and presents a rounded nose to the fluid flow so that it defines a converging gap 211 with the rotor 201b. The gap 211 will as explained before form and stabilize a vortex having a core V in the position shown when the machine is operated. Flow takes place from the rotor as shown into the diffuser section 212 defined between the vortex core V, means 210, and casing 203 where a part of the velocity energy of the fluid is transformed to pressure. Flow continues into the axially displaced region 215 forming the entry to the third stage 200c and is guided into the rotor thereof by vanes 216 and by the casing 203. The flow between the first and second stages 201a and 201b takes place in the same manner. There is no diffuser for the third stage 200c.

The design of the stages shown in FIGS. 19 and 20 follows the principles explained with reference to FIGS. 1–6 and it will be appreciated that the vortex forming and stabilizing means 210 corresponds to the means 12 of FIG. 1 and that the diffuser section 212 corresponds to the diffuser section 14.

Figure 21:
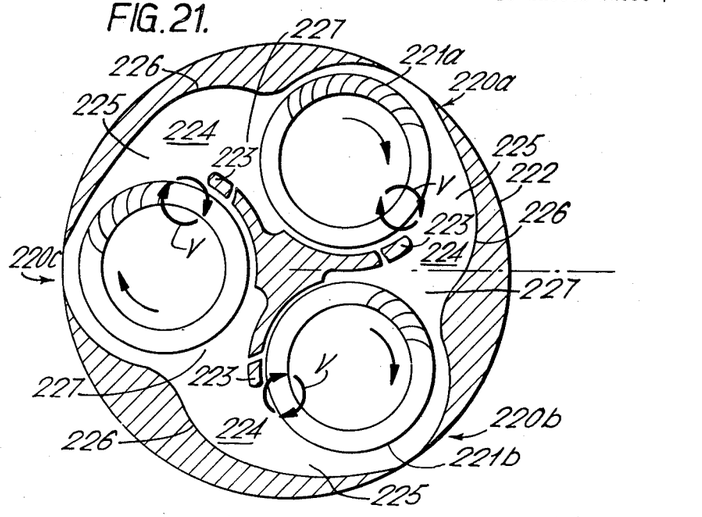
FIG. 21 is a cross-sectional view of a machine constructed according to the invention having a plurality of stages.
Figure 22:
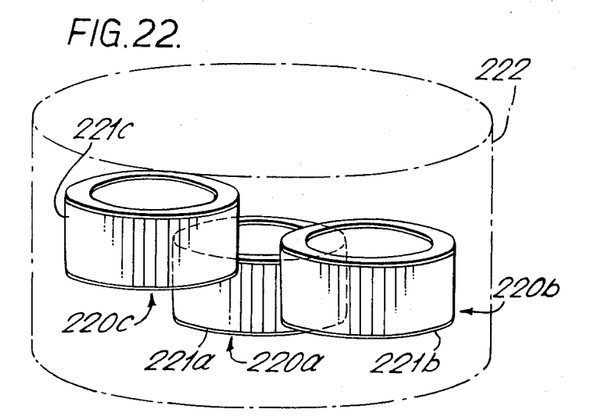
FIG. 22 is a partial sectional perspective view of the machine in FIG. 21.

A different embodiment of the multi-stage fluid machine is illustrated in FIGS. 21 and 22 wherein the machine shown has stages 220a, 220b and 220c. The three stages illustrated have three similar rotors 221a, 221b and 221c mounted within a generally cylindrical casing 222 for rotation about parallel axes spaced on the periphery of a circle concentric with the casing. The rotors are displaced axially one upon the other as shown in FIG. 22 by approximately ⅓ of their axial depth. In the event that more stages are to be added, the rotor of a fourth stage, which is not shown, would be coaxial with the rotor of the first stage 220a and the rotor of a fifth stage coaxial with that of the second stage 220b and so on until the desired number of stages were included. The points of entry and exit from the machine shown in the figures are not illustrated, it being understood that they may be at any convenient spot adjacent the first and last stages. Guide means are provided in the casing 222 between each pair of adjacent stages and include a vortex forming and stabilizing means 223 which in operation with the machine will form and stabilize a vortex having a core V. A diffuser section 224 is contained at the outlet 225 from each stage for increasing pressure of fluid guided by wall 226 to the entry 227 of the succeeding stage. Walls 226 produce the necessary axial component of flow so that the flow may flow axially to the several stages.

Figure 23:
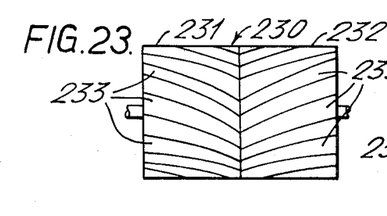
FIG. 23 is a side view of an improved rotor construction giving an axial component of flow.
Figure 24:
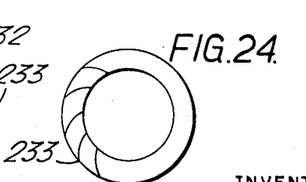
FIG. 24 is a partial end view of the rotor shown in FIG. 23.
Figure 25:
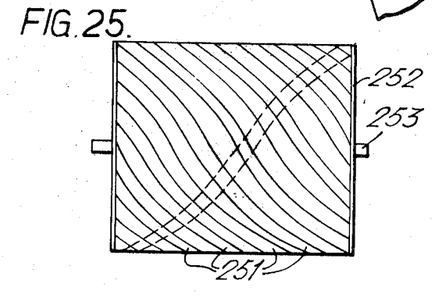
FIG. 25 is a side view of a modified rotor construction from that shown in FIG. 23.
Figure 26:
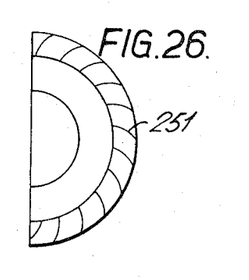
FIG. 26 is a partial end view of the rotor illustrated in FIG. 25.

It is to be noted that the rotor blades shown in FIG. 20 are placed at an angle to the rotor axis and are not parallel thereof as shown in FIG. 1. This serves to give the air leaving the rotor an axial component of velocity so that the air may flow to the entry side of an adjacent stage. The rotors shown in FIGS. 23 and 25 illustrate two further constructions whereby the air passing through the rotor is given an axial velocity component. The rotor 230 illustrated in FIG. 23 is a composite rotor built by joining two individual rotors 231 and 232 together at their ends so that they will have a mirror symmetry about a central plane perpendicular to the axes of the rotor. The blades 233 of each rotor form portions of spirals and the blades join at the center of the rotor 230. The axial components of flow produced by the blades of the two individual rotors will be opposite.

The rotor 250 illustrated in FIG. 25 comprises a plurality of blades 251 which are mounted in a spiral fashion about end retainer means 252 in turn mounted to shaft members 253. In this form of rotor construction, the flow is given an axial component in one direction only.

Figures 27, 28:
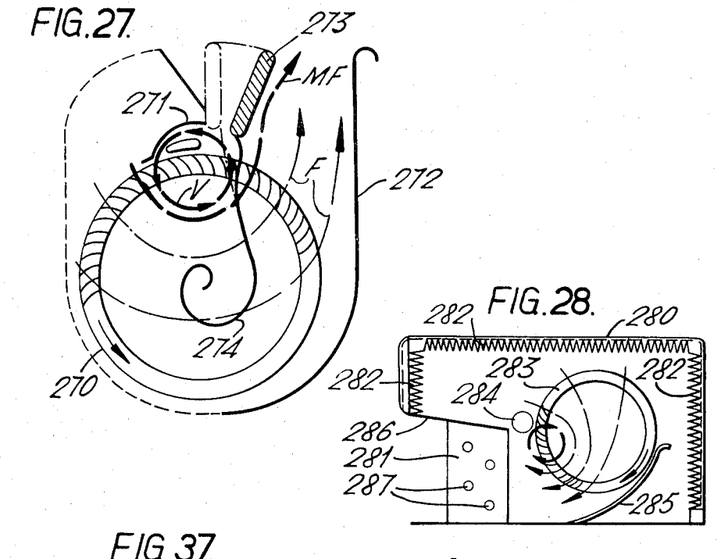
FIG. 27 is a cross-sectional view of a fan heater having temperature responsive control means for controlling throughput.
FIG. 28 is a cross-sectional view of a modified form of a fan heater using a cross-flow machine having filter means on the suction side.

Cross-flow machines of the type described are particularly adaptable for use as fan heaters and dryers which utilize the principle that heat transference from a plate to air increases under turbulent flow conditions. In FIG. 27, a heater is shown comprising a bladed rotor 270 mounted for rotation about its axis by means not shown. A vortex forming and stabilizing means 271 extending the length of the rotor and which generally resembles that shown in FIG. 1 forms a vortex having a core V in the manner as previously described. The heater shown has a fixed outlet wall 272 and a movable outlet heater wall 273 carrying electrical heater means, not shown. The heater wall 273 is mounted on a bimetallic support 274 positioned so as to minimize obstruction to air flow and so that when an electrical current passing through the heater means is off, the wall 273 takes up the dotted position in which it lies parallel to the wall 272.

In operation of the fan heater, a Rankine vortex is set up having a core V and air flows through the rotor along the flow lines F and MF with the maximum velocity flow tube being indicated as MF. When the heating current is off and the wall 273 assumes a position parallel to wall 272, the air issuing from the outlet of the unit will travel a substantial distance since it issues at high velocity. When the heating current is on, the heater wall 273 will heat up and in turn heat up support 274 to cause it to move wall 273 outwardly as shown toward the full-line position to intercept and deflect the maximum velocity flow tube MF, thus setting up considerable turbulence and reduction of throughput. These turbulent conditions are ideal for transferring heat from the heater wall to the air and the air will flow from the machine in a divergent stream since the walls 273 and 272 converge relatively towards each other such that the velocity decreases rapidly with increasing distance from the outlet. If the temperature of the wall 273 rises further, the additional heat transmitted to the bimetallic support 274 will cause that support to pivot the wall clockwise as seen in the figure to the full-line position. This in turn will further increase turbulence and further improve the conditions for heat transfer between the air and the heating means contained in wall 273 so as to reduce the temperature of the wall. As the heater wall cools because of the increase in heat transfer, the support 274 cools and pivots the wall counterclockwise to reduce turbulence and reduce the heat transference to the air. Thus it is seen that a constant thermal loading of the heater is substantially maintained. If desired, the support 274 may be eliminated and the wall 273 connected directly to an off-on heating current switch which moves the wall outwardly when the heating current is switched on.

Cross-flow machines of the type described may be used to advantage in other fan constructions. The fan structure illustrated in FIG. 28 comprises a generally box-shaped cover 280 which has one side cut away to form an outlet 281. The remainder of the side of the cover on which the outlet 281 is located, the top of the cover and the opposite side of the cover from the outlet, are perforated and support a filter 282 on the inside areas. A bladed rotor 283 is rotatably mounted within the cover about an axis and a small cylinder 284 is mounted parallel and adjacent thereto which serves as a vortex forming and stabilizing means. A guide wall 285 is positioned radially opposite the rotor from the cylinder 284 and corresponds generally with the wall 11 of FIG. 1. In operation of the device, a vortex having a core V is formed and air flows through the rotor 283 along the flow lines indicated. A wall 286 extends from the cover 280 adjacent the outlet 281 to a point close to the cylinder 284 to form an upper portion of the outlet and heating coils 287 are located within the outlet. In operation, air passes through the complete area of the filter 282 at a low velocity, through the rotor, and is then discharged outward through the outlet 281 past the heating coils 287 whereby the air may be heated.

Figures 29, 30, 31, 32:
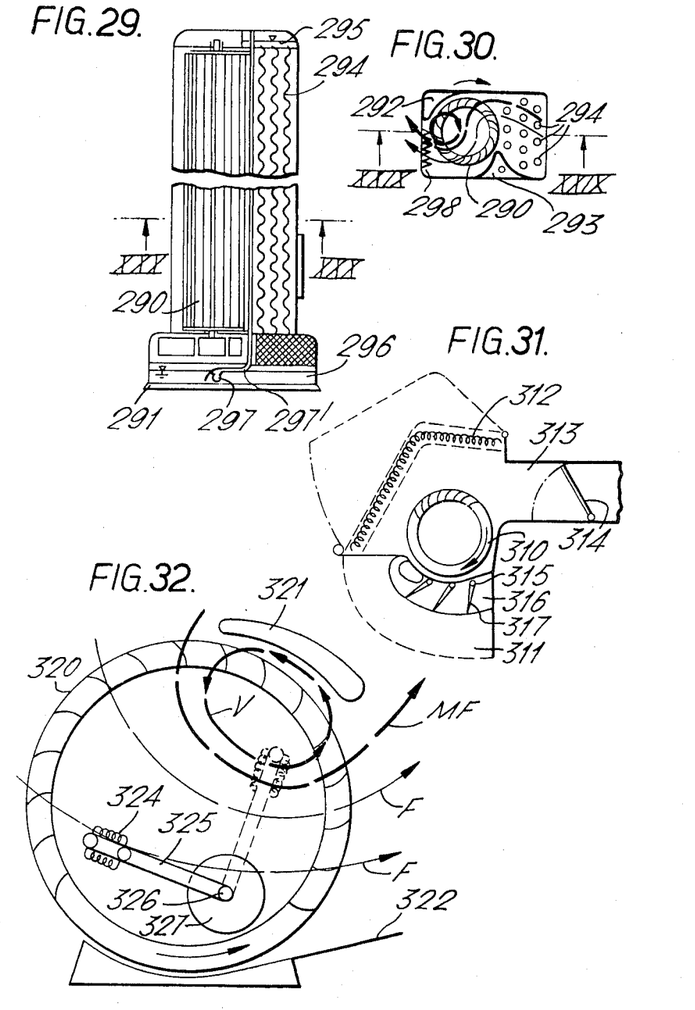
FIG. 29 is a partial cross-sectional view of a fan heater using a cross-flow machine mounted for rotation about a vertical axis.
FIG. 30 is a cross-sectional view of a machine illustrated in FIG. 29 taken along lines XXX—XXX.
FIG. 31 is a partial cross-sectional view of still another form of a room ventilating fan heater using a cross-flow machine having additional means for the admission of fresh air to the machine.
FIG. 32 is a partial cross-sectional view of a dryer using a cross-flow machine.

FIGS. 29 and 30 illustrate a further form of fan construction wherein the rotor axis of the cross-flow machine utilized is vertical. In this construction, the bladed rotor 290 is mounted for rotation about a vertical axis in a support member or mount 291. Vortex forming and stabilizing means 292 extend parallel to the rotor in order to form with the rotor a fluid vortex of the type previously described. In addition, a guide wall 293 likewise extends the length of the rotor in order to direct the flow of air leaving the machine.

A filter comprising a number of coils 294 extends vertically over the length of the rotor 290 at its entry side between a header tank 295 and a collector tank 296. The header tank 295 contains water, and a pump 297 adjacent the collector tank 296 serves to circulate water from the collector tank through the conduit 297' to the header tank wherein it may flow down the coils 294 in a thin film. Dust will thereby be filtered from the air entering the rotor past the coils 294 while at the same time, the air passing through the heater is moistened to raise the humidity. Heater coils 298 may be provided so that air leaving the rotor may be heated.

The device illustrated in FIGS. 29 and 30 has an advantage over conventional heaters in that only filtered air passes over the heated coils. These coils may therefore be heated as much as desired without danger of combustion of dust particles adhering to the coils. Further the heater may be used either as a jet type heater or as a convector type heater.

The machine illustrated in FIG. 31 relates to a circulating air heating device for a room utilizing a cross-flow machine comprising a rotor 310 which delivers air to an outlet duct 311 which is drawn into the rotor from the room through a filter 312. The air passing through the rotor may be admixed with a desired quantity of fresh air admitted through the duct 313 by means of valve 314. Heating pipes 315 are mounted in the exit of the machine and carry fins 316 which extend parallel to the direction of flow through the machine and transversely of the pipes. Vanes 317 form diverging passages of the type indicated generally in FIG. 18 whereby the velocity energy of the fluid may be transformed to pressure energy. This embodiment of heater may incorporate an air moistening device and an automatic regulating means if desired. The rotor 310 and the associated vortex forming and stabilizing means are not shown in detail but it is to be understood that they are constructed and operated on the principles set forth with reference to FIGS. 1–6.

A further embodiment of a heater is disclosed in FIG. 32 which comprises a bladed rotor 320 substantially closed at its ends and mounted for rotation about its axis. Vortex forming and stabilizing means 321 extend the length of the rotor in order to form a fluid vortex having a core V as shown when the machine is operated. In addition, guide wall means 322 are provided to direct flow of air issuing from the exit of the machine.

Heating coils 322 extend the length of the rotor and are supported therein so as to lie parallel to the rotor axis by means of an arm 325 positioned out of the path of the air flow through the rotor. The arm 325 is pivoted about an axis 326 parallel to the axis of the rotor and is associated with a switch 327 for controlling current passing to the heating coils. The arm may be positioned to bring the coils 324 either into the full-line position where the heater current is off or into the dotted-line position where the heater current is on.

In the full-line position, the heating coils 324 lie in the path of the slow flow tubes and so cause only small disturbances of flow through the rotor. Since the switch 327 is off in this position, the rotor will then deliver a stream of cooled air at a substantial velocity. When the heating coils 324 are moved to the dotted-line position, they then lie in the path of the high velocity flow tubes and tend to disrupt the flow forming the vortex core and increase turbulence of the fluid passing through the rotor to the outlet of the machine which in turn improves the conditions for exchange of heat between the coils and air.

Figure 33:
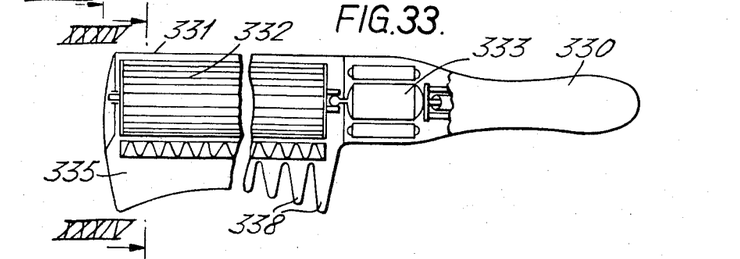
FIG. 33 is a partial cross-sectional view of a portable dryer using a cross-flow machine.

A fluid flow machine of the type described is particularly adaptable for use with portable dryers having small dimensions, such as hair dryers, because of the increased efficiency of the flow machine at low Reynolds numbers conditions. The structure shown in FIG. 33 relates to such a portable hair dryer and comprises a handle 330 having a sheet metal shroud 331. The handle 330 and shroud 331 are coaxial with a cylindrical bladed rotor 332 mounted for rotation about its axis. The rotor is driven by an electric motor 333 contained in the handle. A vortex forming and stabilizing means 334 shown in FIG. 34 performs the same function as the means 12 in FIG. 1 in that it sets up on rotation of the rotor a vortex having a core V. The shroud also has generally converging outlet walls 335 and 336 between which are mounted a heater coil 337 in order to heat air passing thereby. These walls may converge in two different ways such as illustrated in FIG. 33. In the construction shown on the left side of FIG. 33, the walls converge in a narrow slot extending the length of the rotor while alternatively, they may terminate in a series of individual nozzles 338 as shown on the right side of FIG. 33.

Figures 34, 35, 36:
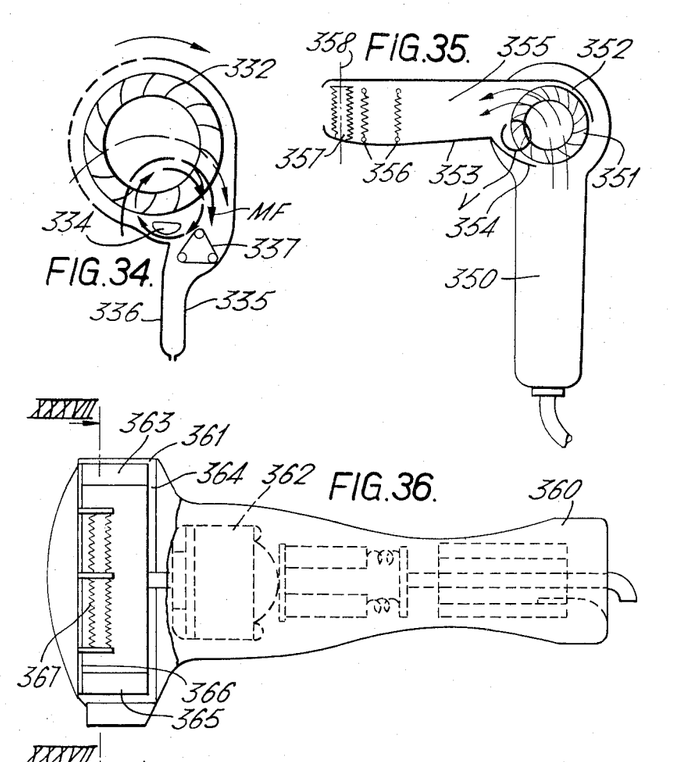
FIG. 34 is a cross-sectional view of the dryer of FIG. 33 taken along lines XXXIV—XXXIV of FIG. 33.
FIG. 35 is a partial cross-sectional view of a portable dryer utilizing a cross-flow machine and having heating elements located at the exit thereof.
FIG. 36 is a partial cross-sectional plan view of a portable dryer utilizing a cross-flow machine having heating coils disposed within the rotor.

A further embodiment of a portable dryer is shown in FIG. 35 where the dryer comprises a handle 350 which rotatably supports at one end a bladed rotor 351 and which has a shroud 352 surrounding the rotor and extending away from the handle at right angles thereto in an extension 353. Preferably the extension is pivoted about the rotor axis not shown. The part of the shroud 352 which surrounds the rotor provides a vortex forming and stabilizing means 354 converging with the rotor in the direction of rotation whereby, in operation of the machine, a fluid vortex is formed and such that flow takes place as indicated by the flow lines. The shroud 352 extends into a duct 355 across which are located heating coils 356. A flat sheet metal plate 357 is positioned between the exit of the duct and the heating coils. This plate is serrated along its edges and is pivotally mounted on its axis 358. In general, machines according to the invention produce an air flow having little turbulence. Often, however, it is desirable that there be some turbulence present, and for this reason, the plate 357 can be turned through a right angle to present its face to the air flow to increase turbulence.

Reference is made to FIG. 36 which discloses still a further embodiment of a portable heating device utilizing a cross-flow machine constructed according to the invention. The device shown in FIG. 36 comprises a handle 360 having a short coaxial shroud 361 of comparatively large diameter. An electric motor 362 is mounted in the handle and drives a bladed rotor 363 located coaxially within the shroud and closed at the motor end by a disc 364 which supports the blades 365 of the rotor. The other end of the rotor is substantially closed by the end wall 366 which is secured to the shroud and which supports therein a plurality of heater coils 367. Air passes from the machine through outlet 368. Although the heater coils 367 obstruct to some extent the free flow of air through the rotor 363, the construction shown has the advantage in that the heater elements are protected without the inclusion of separate special housing means.

It is often desired when constructing a cross-flow machine according to the invention that the parts comprising the machine should be reduced to a minimum in order to reduce expense of manufacture. The structure shown in FIG. 38 comprises a flow machine having a minimum of parts in that the machine consists only of a bladed cylindrical rotor 380 mounted for rotation about its axis, rotation means not shown for rotating the rotor, end wall means 381 substantially covering the ends of the rotor, and a vortex forming and stabilizing means 382 having a wall 383 which converges towards the rotor in the direction of rotation to form a converging gap with the rotor. The rotor when rotated will form a fluid vortex having a core V in the manner as described in FIGS. 1–6. It is not necessary in this form of the invention to have a separate guide wall means similar to the guide wall 10 as shown in FIG. 1 to guide flow of air leaving the rotor nor to define entry and exit regions of the rotor. The effect of the vortex core acting on the flow of the fluid passing through the rotor is utilized as the sole means for guiding the flow. As discussed previously, the major portion of throughput of the rotor occurs along the flow tubes of maximum velocity MF near the vortex core and only a minor portion occurs in the radially opposite part of the rotor. Thus it is not necessary to have separate means guiding the flow to and from this part of the rotor where there is little throughput nor is it necessary to have a means separating the inlet region and outlet region of the rotor at this part where there is minor throughput.

Figures 37, 38:
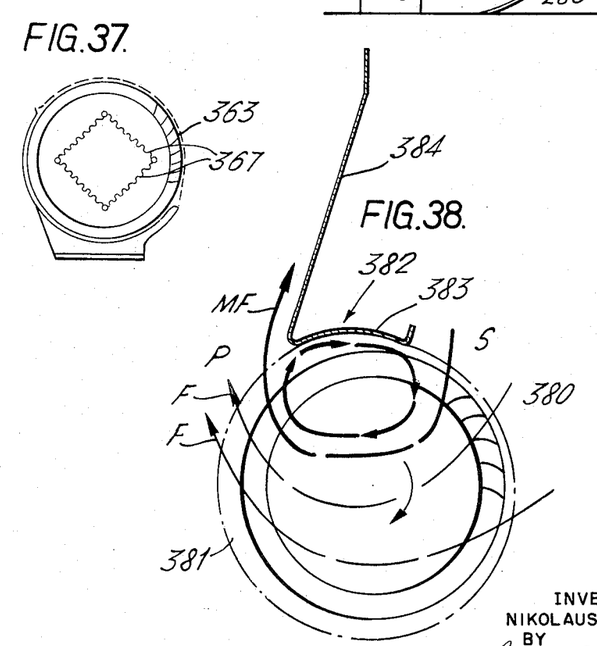
FIG. 37 is a cross-sectional view of FIG. 36 taken along lines XXXVII—XXXVII.
FIG. 38 is a partial cross-sectional view of a fluid flow machine constructed according to the invention in which separate guide walls separating the entry and delivery side of a rotor are eliminated.

The portion 384 of the vortex forming and stabilizing means may, if desired, be used to direct flow of a maximum flow tube MF and to prevent it from being recirculated back to the entry side of the rotor. It is to be noted, however, that this portion is not absolutely essential and that the machine will function as a fluid machine with only the wall portion 383 serving to separate the suction and pressure regions of the machine.

I claim:

1. A fluid flow machine of the cross-flow type comprising a hollow cylindrically bladed rotor mounted for rotation about its axis wherein said blades are concave in the direction of rotation with their outer edges leading their inner edges; circumferentially spaced inlet and outlet guide wall surfaces extending the axial length of said rotor and forming a side wall of an inlet duct and a side wall of an outlet duct; vortex forming and stabilizing means exterior of said rotor having a guide portion extending between the guide surfaces forming the exit duct and the inlet duct which when the machine is operated guides a portion of the flow from the exit duct back towards the inlet duct in the same direction of rotation of said rotor to form and stabilize a fluid vortex which extends the length of the rotor and which has a core interpenetrating the path of the rotating blades whereby fluid will flow from a suction side of said machine into the rotor through the path of the rotating blades and thence out of the rotor through the path of the rotating blades to the exit duct in a plane transverse to the rotor axis and whereby a major part of the fluid flowing through said machine passes through the rotor adjacent said core; and movable flow control means positioned on the suction side of said machine and in one position being flush with said inlet guide surface and in another position extending transversely outwardly from said inlet guide surface to control flow of the major part of fluid passing adjacent said core from the intake side of the fluid flow machine to the discharge side thereof whereby the throughput of said machine may be regulated.

2. A fluid flow machine according to claim 1 whereby said movable flow control means comprises a flap pivotally mounted on said inlet guide surface whereby when said flap is pivoted outwardly into said inlet duct, it will block flow of the major portion of fluid passing adjacent said core, and whereby when said flap is moved inwardly it will be substantially flush with said inlet guide surface to present minimum interference with flow of fluid entering said rotor.

References Cited by the Examiner
UNITED STATES PATENTS

| | | | |
|---|---|---|---|
| 1,920,952 | 8/1933 | Anderson | 230—125 |
| 2,276,144 | 3/1942 | Bergstrom | 219—39.1 |
| 2,278,180 | 3/1942 | Lewis | 219—39.1 |
| 2,478,457 | 4/1949 | Camerino et al. | 230—114 |
| 2,658,700 | 11/1953 | Howell. | |
| 2,833,464 | 5/1958 | Sharp | 230—134.5 |
| 2,878,989 | 3/1959 | Sprouse | 230—134.5 |
| 2,942,773 | 6/1960 | Eck | 230—125 |
| 3,035,760 | 5/1962 | Simmons | 230—125 |

FOREIGN PATENTS 291,007   8/1928   Great Britain.

OTHER REFERENCES

German printed application, 1,046,245, November 1958.

DONLEY J. STOCKING, *Primary Examiner.*

JOSEPH H. BRANSON, JR., HENRY F. RADUAZO,
*Examiners.*